US011216854B2

(12) United States Patent
DeLuca

(10) Patent No.: US 11,216,854 B2
(45) Date of Patent: Jan. 4, 2022

(54) SOFTWARE DISTRIBUTION ACCOUNTING

(75) Inventor: Michael Joseph DeLuca, Boca Raton, FL (US)

(73) Assignee: BlackBerry Limited, Waterloo (CA)

( * ) Notice: Subject to any disclaimer, the term of this patent is extended or adjusted under 35 U.S.C. 154(b) by 1245 days.

(21) Appl. No.: 13/458,409

(22) Filed: Apr. 27, 2012

(65) Prior Publication Data
US 2013/0290132 A1 Oct. 31, 2013

(51) Int. Cl.
*G06Q 30/06* (2012.01)
*G06Q 30/04* (2012.01)
G06F 8/61 (2018.01)

(52) U.S. Cl.
CPC .............. *G06Q 30/04* (2013.01); *G06F 8/61* (2013.01)

(58) Field of Classification Search
CPC .......... G06F 9/445; G06F 11/00; G06F 13/10; G06F 17/60; G06F 21/00; H04L 9/00; H04M 1/66
USPC ................ 395/186; 705/52; 710/8; 455/411; 717/178
See application file for complete search history.

(56) References Cited

U.S. PATENT DOCUMENTS

| 5,892,900 | A | * | 4/1999 | Ginter ..................... G06Q 20/12 726/26 |
| 6,226,618 | B1 | * | 5/2001 | Downs ..................... H04L 67/18 705/51 |
| 6,862,696 | B1 | | 3/2005 | Voas et al. |
| 7,092,987 | B2 | | 8/2006 | Brittingham et al. |
| 7,113,766 | B2 | | 9/2006 | Horel et al. |
| 7,191,439 | B2 | * | 3/2007 | Donaldson .......... G06F 9/45537 717/121 |
| 7,665,094 | B2 | | 2/2010 | Frender et al. |
| 7,913,081 | B2 | | 3/2011 | Li et al. |
| 7,913,249 | B1 | | 3/2011 | Macintyre |
| 2001/0030773 | A1 | * | 10/2001 | Matsuura ........... H04N 1/00132 358/471 |

(Continued)

FOREIGN PATENT DOCUMENTS

CA 2813332 A1 10/2013

OTHER PUBLICATIONS

Ron White, How Computers Work, 15 Oct. 15, 2003, Que Publishing, 7th Ed, p. 4 (Year: 2003).*

(Continued)

*Primary Examiner* — John W Hayes
*Assistant Examiner* — Nakia Leffall-Allen
(74) *Attorney, Agent, or Firm* — Conley Rose, P.C.; J. Robert Brown, Jr.; Gayatry S. Nair

(57) ABSTRACT

A software product server, such as an application server or application store, can receive a purchase request for an application from a remote device. In response to a received request, the software product server is configured to provide an application to a remote device. The remote device receives the application and determines whether the received application is compatible with the remote device. The remote device is configured to generate a verification signal about the compatibility and provide the verification signal to a verification module coupled to the software product server. The verification signal is used to update a user account debit status. For example, a user account is debited when the verification signal indicates the received application is compatible with the remote device.

20 Claims, 7 Drawing Sheets

(56) References Cited

U.S. PATENT DOCUMENTS

| | | | |
|---|---|---|---|
| 2002/0112052 A1* | 8/2002 | Brittingham | G06F 9/44505 709/224 |
| 2002/0199180 A1* | 12/2002 | Donaldson | G06F 9/45537 717/178 |
| 2003/0120557 A1* | 6/2003 | Evans | G06Q 30/0601 705/51 |
| 2003/0192041 A1 | 10/2003 | Mentze et al. | |
| 2004/0083474 A1 | 4/2004 | McKinlay et al. | |
| 2004/0128250 A1* | 7/2004 | Fox | G06Q 30/0601 705/52 |
| 2004/0181459 A1 | 9/2004 | Wright et al. | |
| 2005/0195978 A1* | 9/2005 | Babic | G06F 21/10 380/231 |
| 2005/0256805 A1* | 11/2005 | Satkunanathan | H04L 63/1408 705/59 |
| 2006/0026304 A1* | 2/2006 | Price | G06F 8/65 710/8 |
| 2006/0048141 A1 | 3/2006 | Persson | |
| 2006/0122958 A1* | 6/2006 | Beisiegel | G06F 17/30699 |
| 2006/0190350 A1* | 8/2006 | Maas | G06Q 30/00 705/26.62 |
| 2006/0282823 A1* | 12/2006 | Li | G06F 8/61 717/121 |
| 2007/0155306 A1 | 7/2007 | Koli et al. | |
| 2008/0114830 A1* | 5/2008 | Welingkar | G06F 17/30575 709/203 |
| 2008/0228503 A1 | 9/2008 | Buchheit | |
| 2008/0301266 A1* | 12/2008 | Savkar | H04L 41/0803 709/220 |
| 2009/0075736 A1* | 3/2009 | Kniberg | A63F 13/49 463/42 |
| 2009/0144764 A1* | 6/2009 | Mehta | H04N 7/17318 725/1 |
| 2010/0233996 A1* | 9/2010 | Herz | H04W 4/50 455/411 |
| 2010/0235373 A1 | 9/2010 | Holden et al. | |
| 2010/0248699 A1 | 9/2010 | Dumais | |
| 2010/0304735 A1* | 12/2010 | Hursey | H04Q 3/0025 455/423 |
| 2011/0185231 A1 | 7/2011 | Balestrieri et al. | |
| 2011/0258301 A1 | 10/2011 | McCormick et al. | |
| 2012/0054107 A1* | 3/2012 | Biswas | G06F 21/10 705/53 |
| 2013/0191495 A1* | 7/2013 | Almstrand | G06F 8/64 709/217 |

OTHER PUBLICATIONS

"European Application Serial No. 12187523.1, Extended European Search Report dated Jul. 30, 2014", 7 pgs.

European Examination Report dated Jul. 12, 2016, received for European Application No. 12187523.1.

Canadian Office Action dated Oct. 6, 2017 received for Canadian Application No. 2813332.

Canadian Office Action dated Jul. 29, 2019 received for Canadian Application No. 2813332.

Canadian Office Action dated Aug. 24, 2018 received for Canadian Application No. 2813332.

Anonymous: "Software Testing—Wikipedia", Retrieved from the Internet: URL: https:/len.wikipedia.org/wiki/Software_testing [retrieved on Aug. 24, 2018).

Anonymous: "Software Testing—Wikipedia", Retrieved from the Internet: URL: https:/len.wikipedia.org/wiki/Software_performance_testing (retrieved on Aug. 24, 2018).

Anonymous: "Software Testing—Wikipedia", Retrieved from the Internet: URL: https:/len.wikipedia.org/wiki/Soak_testing (retrieved on Aug. 24, 2018).

Canadian Office Action dated Jul. 16, 2020 received for Canadian Application No. 2813332.

* cited by examiner

SOFTWARE DISTRIBUTION ACCOUNTING

TECHNICAL FIELD

The present disclosure relates to distribution of software products for remote electronic devices.

BACKGROUND

Software products can be shared using tangible or intangible media, such as using disks, the internet, or wireless communications. Some software products, such as software applications (e.g., games, business software, etc.) or digital media content (e.g., books, audio, video files, etc.), can be made available for purchase using an application storefront, which is also referred to herein as an "app store." An application storefront can include online or wireless services that host and distribute software products to remote electronic devices, such as mobile computing devices (mobile feature phones, smartphones, tablet computers, gaming consoles, etc.) or personal computers. An application storefront can sell software products or license a right to use software products, such as by making a software product available for download after a completed purchase transaction.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following detailed description refers to the accompanying drawings that show, by way of illustration, details and examples in which the invention may be practiced. The examples are described in sufficient detail to enable those skilled in the art to practice the examples. Other examples can be used, or structural, logical, or electrical changes can be made without departing from the inventive subject matter. The various examples disclosed herein are not mutually exclusive, and can be combined with one or more other examples to form new examples. The following detailed description is, therefore, not to be taken in a limiting sense.

Figure 1:
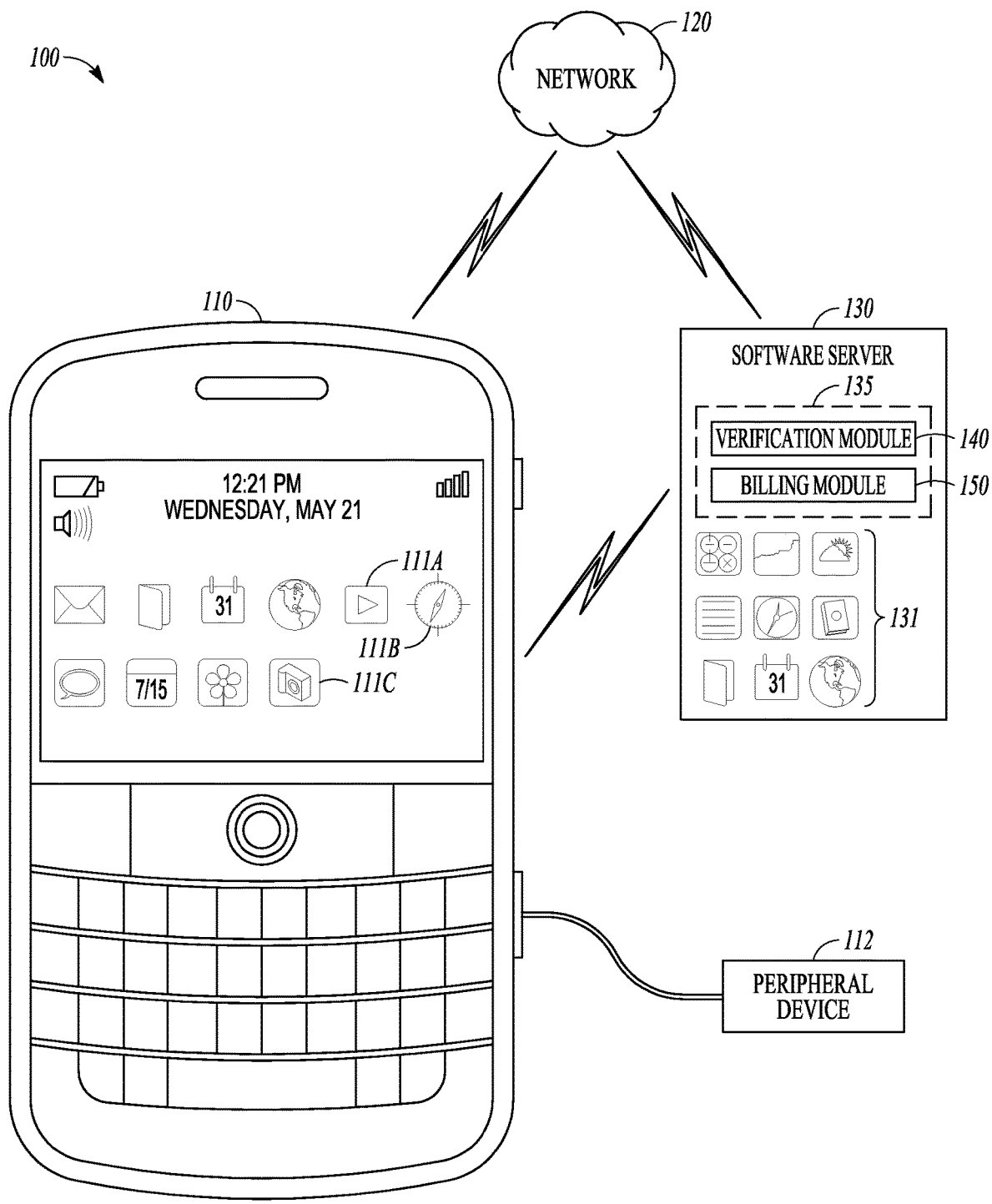
FIG. 1 is a diagram that illustrates generally an example of a system that can include a software server and a remote device in communication with the software server through a network.

FIG. 1 is a diagram that illustrates generally an example of a system 100 that includes a software server 130 and a remote device 110. The remote device 110 and the software server 130 are communicatively coupled, such as using a network 120. The remote device 110 is optionally be coupled to a peripheral device 112.

The remote device 110 can be, among other things, an electronic device such as a mobile telephone (e.g., a feature phone, or smartphone), tablet computer, personal digital assistant (PDA), media player, gaming console, laptop or desktop personal computer, or another device capable of receiving and operating a software product. Throughout this document, the term "software product" refers to a set of instructions or other digital information that is used by a processor to perform one or more tasks. For example, a software product includes a software application or a media file that can be initialized or operated using the remote device 110. A software application includes, among other things, a digital file that includes instructions that are executable by a processor of the remote device 110. A media file includes, among other things, a digital file that includes information, such as audio or graphical information, that can be accessed using an application. In an example, the remote device 110 stores or operates multiple software products, such as multiple device applications, that can be accessible from a user interface of the remote device 110 using corresponding application icons 111A, 111B, or 111C.

The software server 130 includes a transaction manager 135 and a memory that stores multiple software products 131. The transaction manager 135 comprises a verification module 140 or a billing module 150. In an example, the transaction manger 135 is configured to manage software product transactions between the remote device 110 and the software server 130.

The software server 130 can be remotely located, and can be configured to receive a request for a software product (e.g., from the remote device 110) and, in response, the software server 130 can provide the software product to the requesting device or to another device. In an example, the software server 130 is a software application server that receives a request, such as from the remote device 110, for a particular software application from among a library of available software applications or other software products. In an example, the software server 130 can be a digital media server that receives a request for a particular digital media file from among a library of available digital media files (e.g., digital audio files, digital video files, etc.). In an example, the software server 130 includes multiple software products 131 that are selectively chosen by a user. For example, the remote device 110 can receive catalog information from the software server 130, such as via an HTTP request, about software products available for download to the remote device 110. An interface on the remote device 110, such as a web browser application displayed on a display of the remote device 110, can be used to select or request a particular software product from the software server 130. In an example, information (e.g., catalog information, software product request information, software product data, etc.) is exchanged between the remote device 110 and the software server 130, such as directly, or via a cellular or other wireless and/or wired network 120 (e.g., via the internet).

In an example, the remote device 110 is used to purchase and receive a software product from the software server 130, such as to purchase an "app" or a digital media file. In an example, the received software product may not function on the particular receiving device, such as due to an incompatible operating system, hardware profile, or other reason. An "app" or media file can be relatively inexpensive, and it may be inconvenient for a consumer to pursue a refund. This can leave the consumer dissatisfied with the software product purchase experience. The remote device 110 and the software server 130 address this problem and others, such as by identifying whether the received software product is compatible with the remote device 110. A user account is debited or credited depending on the identified compatibility of the received software product and the remote device 110. For example, when a user account is debited before the software server 130 provides a software product, a refund is automatically applied to a user account when an incompatibility is identified. In an example, a user account is debited after a compatibility indication is provided. The compatibility indication can be generated by the remote device 110, such as using application-level or operating system-level processes. The compatibility indication can be generated by another device coupled to the remote device 110 (e.g., the software server 130), such as in response to information provided by the remote device 110.

In the example of FIG. 1, the transaction manager 135 is provided to manage software product requests. The transaction manager 135 includes the verification module 140 or the billing module 150. The transaction manager 135 can be an intermediary configured to receive a software product request, such as from the remote device 110, and instruct the software server 130 to provide the requested software product. The verification module 140 and/or the billing module 150 are communicatively coupled to the software server 130 and/or the remote device 110, such as via the network 120. In an example, the transaction manager 135, the verification module 140, or the billing module 150 is a component or subsystem of the software server 130.

The verification module 140 is configured to receive information generated by the remote device 110 about compatibility of a software product with the remote device 110. For example, the verification module 140 receives a verification signal, generated by the remote device 110, about compatibility of the remote device 110 and a software product received from the software server 130. The verification signal includes information about whether the remote device 110 can successfully operate a software product. For example, the verification signal can include information about an attempt by the remote device 110 to operate a software product. In an example, the verification signal includes information about whether a feature of the remote device 110 (e.g., a software or hardware feature) is compatible with a requirement of a software product. For example, the verification signal can include information about an operating system type or version of the remote device 110, or information about availability of a specified peripheral device 112.

The billing module 150 is configured to receive the verification signal, or information derived from the verification signal, such as from the transaction manager 135 or the remote device 110. The billing module 150 uses the verification signal to update a billing status, including to debit or credit a user account. The billing module 150 is communicatively coupled to the software server 130, the verification module 140, and/or the remote device 110, such as via the network 120. In an example, the billing module 150 is a component or subsystem of the software server 130 or the verification module 140.

In an example, the billing module 150 uses the verification signal to debit or credit a user account that is associated with the remote device 110. For example, when the verification signal indicates that the remote device 110 successfully operates, or can successfully operate, a software product received from the software server 130, the billing module 150 can debit a user account. In an example, a user account is debited before the software server 130 provides a software product to the remote device 110. In this example, when the verification signal indicates that the remote device 110 successfully operates, or can successfully operate, the software product received from the software server 130, the billing module 150 can confirm a prior user account debit. In an example, when the verification signal indicates that the remote device 110 unsuccessfully operates, or cannot successfully operate, the software product received from the software server 130, the billing module 150 can refund a prior user account debit, or can release a user account credit hold, such as a credit card authorization hold.

In an example, the remote device 110 is coupled to a peripheral device 112. The remote device 110 can be coupled to the peripheral device 112 using a wired or wireless connection. The peripheral device can include, among other things, a Bluetooth® device (e.g., a speaker and microphone headset, etc.), a battery pack, an antenna, or an external storage device. The remote device 110 can be configured to use the peripheral device 112 with a software product received from the software server 130. For example, the remote device 110 can use a high-fidelity audio recording application, such as received from the software server 130, when a high-fidelity microphone is coupled to the remote device 110.

Figure 2:
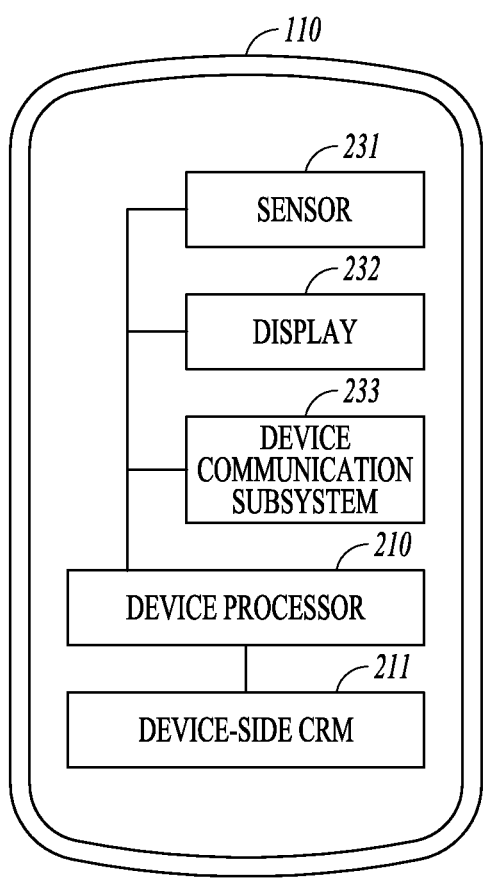
FIG. 2 is a diagram that illustrates generally an example of the remote device shown in FIG. 1.

FIG. 2 is a diagram that illustrates generally an example of the remote device 110 shown in FIG. 1. The remote device 110 includes a device processor 210 and a device-side computer-readable medium 211 ("device-side CRM"). The remote device 110 includes a sensor 231, a display 232, a device communication subsystem 233, a camera (not shown), a memory (not shown), a microphone or speaker (not shown), or a GPS receiver (not shown), among other components. In an example, the remote device 110 is a mobile device that can store and operate software products, such as mobile device software applications.

The device-side CRM 211 includes a fixed, remote, or removable storage medium, such as a hard disk, flash, or other volatile or non-volatile memory configured to store information for use by the remote device 110. The device-side CRM 211 includes information or instructions that, when executed by the device processor 210, cause the remote device 110 to behave in a particular manner or to perform a particular function. For example, the device-side CRM 211 can be used to store software products, such as an operating system, software applications, or media files, such as can be pre-loaded or received from the software server 130.

The device processor 210 can access the stored software products using an operating system and interface of the remote device 110. For example, information from the device-side CRM 211 can be used by the device processor 210 to interact with the hardware components of the remote device 110 (e.g., the display 232, sensor 231, etc.) via a user interface, such as a graphical user interface (GUI).

The device processor 210 and the device-side CRM use an operating system to handle basic device services or to coordinate one or more hardware or software components. For example, an operating system is used to receive or provide information via the GUI. In an example, an operating system is configured to use one or more hardware components of the remote device 110, such as the sensor 231, the display 232, the device communication subsystem 233, a camera (not shown), a memory (not shown), a microphone or speaker (not shown), or a GPS receiver (not shown), among others.

The sensor 231 can be, among other sensors, an acoustic sensor (e.g., a microphone), an optical sensor (e.g., a light sensor), an electrical sensor (e.g., a sensor configured to receive electrical information, such as from a user's touch-based input), or some other sensor configured to receive information, such as from a user input. For example, the sensor 231 can include a keypad or a touch-screen that a user can use to interact with a software product operated by the remote device 110. The remote device 110 can include a display 232, such as an LCD screen, to provide visual information to a user. The display 232 can display information from a software product, such as a software product received from the software server 130. In an example, the display 232 displays a list comprising software products that are available to the remote device 110 from the software server 130, or the display 232 displays verification or billing information about the user and an application received from the software server 130.

The device communication subsystem 233 is configured to facilitate or handle communications with other systems or devices. For example, the device communication subsystem 233 is used to establish a wired or wireless connection to the network 120 or to the software server 130, such as directly or via an intermediate device. The device communication subsystem 233 can include RF or other transmitter or receiver components, such as an antenna, a signal amplifier, or a frequency converter. The device communication subsystem 233 configuration can be adjusted to accommodate various networks or protocols, such as to enable the remote device 110 to communicate using a GSM network, a Bluetooth® network, Near Field Communication (NFC), or a WiFi network, among others.

In an example, the device-side CRM 211 includes instructions that, when executed by the device processor 210, cause the remote device to 110 to provide a request to the software server 130 for a software product. For example, a user-interface of the remote device 110 can be configured to receive a user input (e.g., via the sensor 231) that instructs the remote device 110 to initiate a software product download from the software server 130 (e.g., wirelessly using the device communication subsystem 233). In an example, the user input includes instructions for the remote device 110 to purchase an application from the software server 130, such as by providing user account information to the software server 130, or to the billing module 150. In an example, the remote device 110 includes, such as together with a software product request, information about the remote device 110. Information about the remote device can include device profile information, such as information about, among other things, an operating system, hardware component, or software component of the remote device 110. For example, the device profile information can include a network address or an operating system version.

Figure 3:
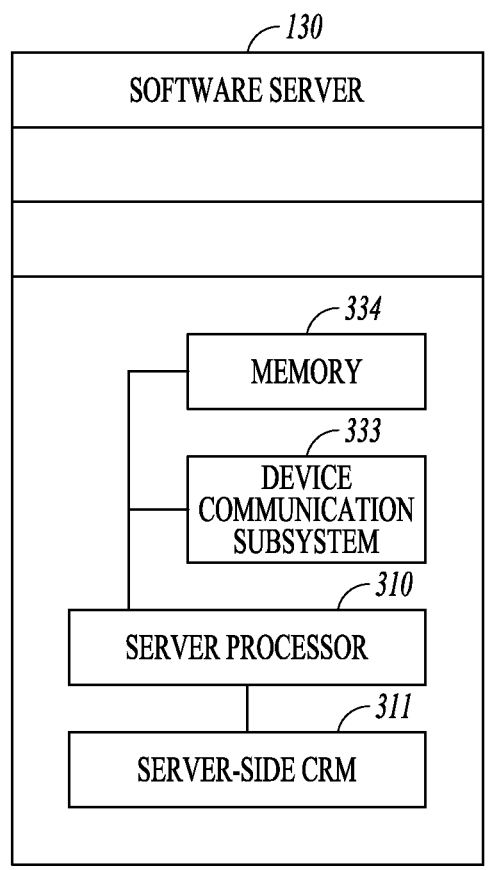
FIG. 3 is a diagram that illustrates generally an example of the software server shown in FIG. 1.

FIG. 3 is a diagram that illustrates generally an example of the software server 130 shown in FIG. 1. The software server 130 includes a server processor 310 and a server-side computer-readable medium 311 ("server-side CRM"). The software server 130 includes a memory 334, and a server communication subsystem 333, among other subsystems or modules.

The server-side CRM 311 includes a fixed, remote, or removable storage medium, such as a hard disk, flash, or other volatile or non-volatile memory configured to store information for use by the software server 130. For example, the server-side CRM 311 stores information or instructions that, when executed by the server processor 310, cause the software server 130 to behave in a particular manner or to perform a particular function. In an example, information from the server-side CRM 311 is used by the server processor 310 to interact with one or more features or modules of the software server 130. For example, the server-side CRM 311 can be used to store software products, such as software applications or digital media files, such as can be remotely retrieved from the software server 130. The server processor 310 accesses the stored software products, such as using an operating system of the software server 130.

The memory 334 stores additional or auxiliary information. The memory 334 can include a hard disk, flash, or other volatile or non-volatile memory. In an example, the memory 334 can store a particular type of software product, such as digital audio files, graphic files, or application files.

The server communication subsystem 333 can be configured to facilitate or handle communications with other systems or devices. For example, the server communication subsystem 333 can be used to establish a wired or wireless connection to the network 120 or to the remote device 110. The server communication subsystem 333 can include RF or other transmitter or receiver components, such as an antenna or a signal amplifier. The server communication subsystem 333 configuration can be adjusted to accommodate various networks or protocols, such as to enable the software server 130 to communicate using a GSM network, a Bluetooth® network, Near Field Communication (NFC), or a WiFi network, among others.

In an example, the server-side CRM 311 includes instructions that, when executed by the server processor 310, cause the software server 130 to receive a request for a software product, such as from the remote device 110 via the transaction manager 135. In response to a request for a software product, the software server 130 retrieves the software product, such as from the memory 334, and provides the software product to the requested location, such as using the server communication subsystem 333.

In an example, the server-side CRM 311 includes instructions for the software server 130 to handle a purchase request for a software product. The software server 130 can handle the purchase request alone, or in coordination with one or more internal or external modules, such as the verification module 140 or the billing module 150. In an example, the software server 130 or the billing module 150 receives user account information, such as information about an account that can be debited before or after providing the requested software product.

In an example, the software server 130 receives information from the remote device 110 about a characteristic of the remote device 110, such as an operating system characteristic or device profile characteristic. The characteristic of the remote device 110 is used by the software server 130 to identify software products that are compatible with the remote device 110. The software server 130 can provide information about the compatible software products to the remote device 110, such as to enable a user of the remote device 110 to review the information about the compatible software products, and to enable the user to request a particular compatible software product. In an example, the software server 130 receives licensing or other account information from the remote device 110, such as can be used to identify and provide the information about the compatible software products to the remote device 110.

Particular methods of using the example systems are described below by reference to a series of flow charts. The methods to be performed can be computer programs or sets of computer-executable instructions. An implementation of such methods can include code, such as microcode, assembly language code, a higher-level language code, or the like. In an example, the code is tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Figure 4:
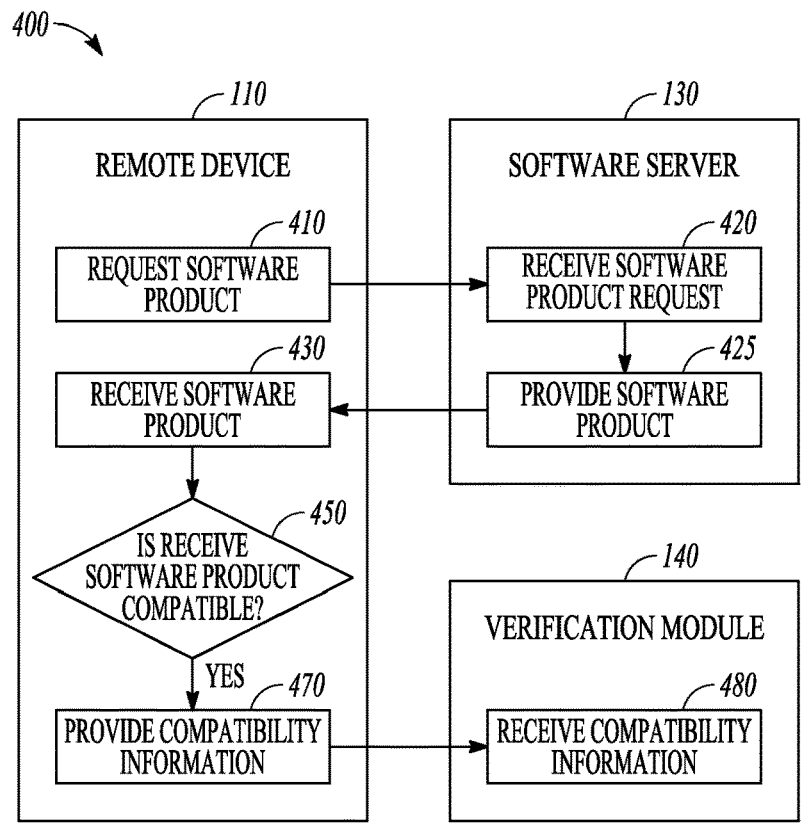
FIG. 4 is a flow chart that illustrates generally an example that includes a software product transaction between a software server and a remote device.

FIG. 4 is a flow chart that illustrates generally an example 400 that includes a software product transaction between the remote device 110 and the software server 130. At block 410, the remote device 110 requests a software product, such as an application software product. In an example, the remote device 110 requests the software product in response to a user request to download the software product. The user can request the software product using a user interface of the remote device 110 to access a software product distributor, such as via an Application Store. Requesting the software product at block 410 can include providing user account information, device profile information, or user billing information, among other information, such as to the software product distributor.

At block 420, the software product request is received by the software server 130. The software server 130 can be a software application server, or another service provider configured to manage software product requests. The software product request can be received by a service provider (e.g., a cellular telephone service provider, network provider, billing manager, etc.) of the remote device 110, and the service provider can relay the request to the software server 130. In an example, the service provider operates the transaction manager 135 to manage a purchase transaction or to coordinate a request from a particular type of remote device 110 with an appropriate software server 130. For example, a first type of remote device 110, such as a smartphone, provides a request at block 410 to a service provider. The service provider uses the transaction manager 135 to direct the request from the smartphone to a smartphone application server that receives the request at block 420. In an example, a second type of remote device 110, such as a tablet PC, provides the request at block 410 to the service provider. The service provider then uses the transaction manager 135 to direct the request from the tablet PC to a tablet PC application server that receives the request at block 420.

At block 425, a software product is provided by the software server 130 to the remote device 110, such as via the network 120. In an example, providing the software product at block 425 includes, among other tasks, receiving device profile information from the remote device 110 (e.g., operating system information, hardware component information, etc.), using the device profile information to identify a software product that is configured to be compatible with the remote device 110, and providing the software product. In an example, providing the software product at block 425 includes providing the software product information to the remote device 110 via the internet, such as using TCP/IP to transmit the software product.

In an example, receiving the software product request at block 420, or providing the software product at block 425, is handled by the server processor 310, the server-side CRM 311, the memory 334, or the server communication subsystem 333. For example, the server processor 310 can identify a software product location in the memory 334. The server processor 310 can use instructions from the server-side CRM 311 to retrieve the software product from the identified location in the memory 334, and provide the software product to the remote device 110, such as using the server communication subsystem 333 to access the internet or a cellular data network.

At block 430, the software product is received by the remote device 110, such as via the internet or a cellular data network. The software product is received using the device communication subsystem 233 and stored, such as in the device-side CRM 211, or in a memory storage component of the remote device 110.

At block 450, the remote device 110 determines whether the software product is compatible with the remote device 110. For example, the remote device 110 determines whether the received software product is compatible with an operating system, or software or hardware component, of the remote device 110. The remote device 110 can determine whether the received software product is incomplete or corrupt. The remote device 110 can determine whether the received software product requires a license or other authority (e.g., a decryption key) to operate the software product. In an example, the remote device 110 can use information about a software product characteristic, such as a file type or version number, to determine whether the software product is expected to successfully operate with the remote device 110. In an example, the remote device 110 can determine whether the received software product successfully operates with the remote device 110 by initializing or running the received software product, such as using the device processor 210.

In an example, at block 450, determining whether the received software product is compatible with the remote device 110 includes generating compatibility information about the remote device 110 and the received software product. The generated compatibility information includes information about, among other things, compatibility of the received software product and an operating system of the remote device 110. The generated compatibility information can include information about compatibility of the received software product and a software or hardware component of the remote device 110. The generated compatibility information can include information about the completeness or corruptness of the received software product. The generated compatibility information can include information about whether the remote device 110, or a peripheral device 112, retains an appropriate license or other authority to use the received software product. In an example, the generated compatibility information can include information generated by the remote device 110 about a file type or version compatibility of the received software product and the remote device 110.

In an example, the generated compatibility information includes information about a partial compatibility of the remote device 110 and the software product, such as information that only a portion of the software product is compatible with the remote device 110. For example, the remote device 110 can include only a portion of a hardware or software component requirement of the application. For example, the software product can include a camera application. The camera application can be configured to use camera hardware and software components of the remote device 110, and to use a GPS component of the remote device 110, such as to automatically associate photographs taken by the remote device 110 with a location of the remote device 110. If the camera hardware and software components are available to the remote device, but the GPS component is not available, the generated compatibility information can indicate that the camera application is only partially compatible with the remote device 110.

In an example, the generated compatibility information includes information about an initialization or operation of the received software product by the remote device 110. For example, the generated compatibility information can include an indication that the device processor 210 properly initialized the received software product, or that the device processor 210 successfully operated the software product. For example, the generated compatibility information can include an indication that the remote device 110 has, or does not have, available any resource (e.g., hardware or software) required by the received software product.

In an example, receiving the software product at block 430 includes receiving an application that requires a particular device hardware profile, or receiving an application that requires a particular peripheral device 112. At block 450, determining whether the received software product is compatible with the remote device 110 can include using the device processor 210 to assess whether the remote device has a required device hardware profile, or whether a particular peripheral device 112 is available to the remote device 110.

In an example, at block 450, the remote device 110 can attempt to initialize or operate a received application. If the remote device 110 successfully initializes or operates the received application, such as after a particular peripheral device 112 is recognized by the device processor 210, then the remote device 110 generates compatibility information that includes an indication that the remote device can successfully operate the received application. If the remote device 110 is unsuccessful at initializing or operating the received application, such as when the device processor 210 cannot locate the particular peripheral device 112, then the remote device 110 generates compatibility information that includes an indication that the remote device 110 cannot successfully operate the received application.

At block 470, the remote device 110 provides the generated compatibility information, such as to an external device. In an example, the compatibility information is provided using a verification signal, such as via the network 120, to the verification module 140. At block 480, a verification signal comprising the compatibility information is received, such as by the verification module 140 or the billing module 150. The verification module 140 or the billing module 150 uses the received compatibility information to update a billing status. Using the received compatibility information to update a billing status can include completing a software purchase transaction. For example, when the received compatibility information indicates that the remote device 110 can successfully operate the received software product, completing the software purchase transaction can include billing a customer, such as using billing or account information associated with a particular remote device 110, or using billing or account information provided with the software product request at block 410. When the received compatibility information indicates that the remote device 110 cannot successfully operate the received application, completing the software purchase transaction can include refunding a customer, releasing a credit hold, or providing a non-debit indication to the billing module 150. Using compatibility information to update a billing status is further discussed below.

Figure 5:
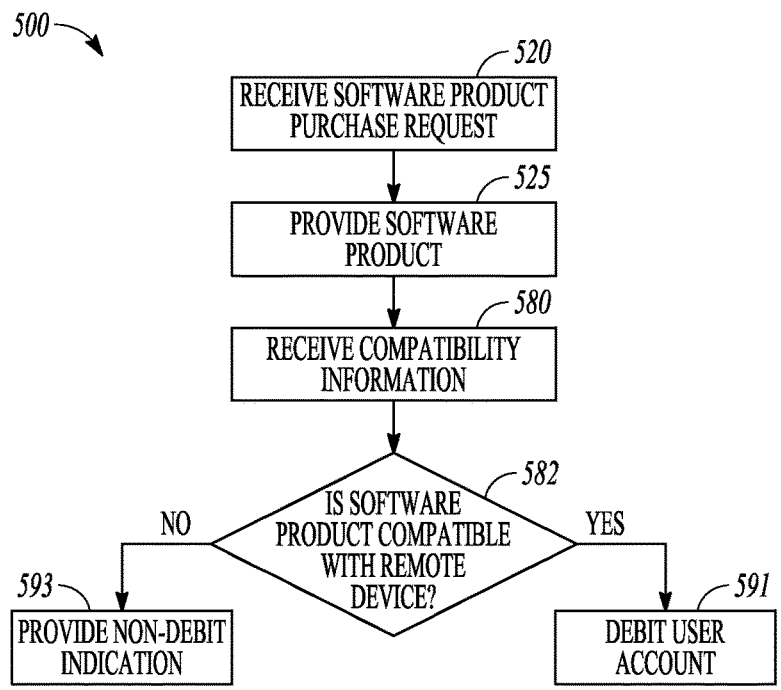
FIG. 5 is a flow chart that illustrates generally an example that includes debiting a user account when a software product is compatible with a remote device.

FIG. 5 is a flow chart that illustrates generally an example 500 that includes debiting a user account when a software product is compatible with a remote device. The example 500 includes debiting a user account when a received software product is compatible with the remote device 110. The example 500 is executed using one or more server-side modules or devices, such as using the software server 130, the verification module 140, the billing module 150, or a service provider system, among others. At block 520, a software product purchase request is received. The purchase request is received, for example, by the software server 130, or by a system coupled to the software server 130, such as the transaction manager 135. The purchase request includes, among other information, billing information or software product identification information. Billing information includes account information, such as financial account information (e.g., bank account information, credit card account information, etc.), or user account information that is linked to a financial or other merit-based account, such as linked internally to a system accessible by the software server 130, or through a third party (e.g., a device service provider). In an example, the billing information is stored, or a credit hold can be placed on a user account, such as a credit hold corresponding to a purchase amount of the software product. Software product identification information includes information to identify a particular software product (e.g., an application name, file identification parameter, etc.), such as information used by the software server 130 to locate or provide the application to the remote device 110.

At block 525, the requested software product is provided, such as to the remote device 110 or to another target device. The software product can be provided such as according to the discussion of FIG. 4 at block 425. At block 580, compatibility information is received. In an example, the compatibility information received at block 580 is generated by the remote device 110, and includes information about whether, or to what extent, the software product (e.g., provided at block 525) is compatible with the remote device 110. The compatibility information can be received using a verification signal generated by the remote device 110. In an example, billing information, such as described herein, can optionally be received with the compatibility information at block 580, such as alternatively or in addition to the billing information received at block 520. In an example, the compatibility information is provided or received according to the discussion of FIG. 4 at block 470 or block 480.

At block 582, received compatibility information (e.g., received at block 580, such as via a verification signal) is used to determine if the provided software product (e.g., provided at block 525) is compatible with the remote device 110. If the received compatibility information indicates that the provided software product is compatible, or is at least partially compatible, with the remote device 110, a user account is debited or charged at block 591. For example, the billing module 150 can use the billing information to debit a user account a purchase amount corresponding to the provided software product. In an example, a credit hold corresponding to the purchase amount can be converted to a purchase, or the credit hold can be released and a purchase amount can be charged. If the compatibility information indicates that the provided software product is only partially compatible, the user account is debited an amount corresponding to a compatible portion of the provided software product. Debiting the user account at block 591 includes using the account information received with the software product purchase request at block 520, or using account information received with the compatibility information at block 580.

If the received compatibility information indicates that the provided software product is not compatible with the remote device 110, a non-debit indication is provided at block 593. In an example, providing the non-debit indication at block 593 includes providing a signal to the remote device 110 to notify a user of the remote device 110 that the purchase transaction is incomplete, or was terminated. The signal optionally includes information about why the transaction is incomplete (e.g., because the remote device 110 and the received software product are not compatible). Providing the non-debit indication at block 593 can include releasing a credit hold on a user account, or refunding all or a portion of a previously-paid purchase amount.

Figure 6:
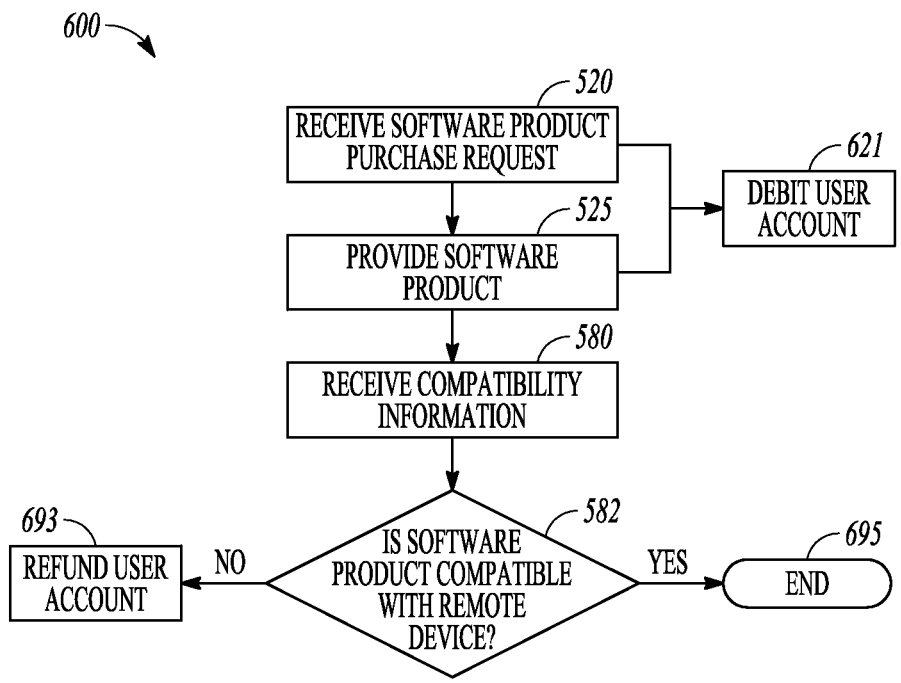
FIG. 6 is a flow chart that illustrates generally an example that includes refunding a user account when a software product is incompatible with a remote device.

FIG. 6 is a flow chart that illustrates generally an example 600 that includes refunding a user account when a software product is incompatible with a remote device. The example 600 includes refunding a user account when a software product received from the software server 130 is incompatible with the remote device 110. The example 600 is executed using one or more server-side modules or devices, such as using the software server 130, the verification module 140, the billing module 150, or a service provider system, among others. The example 600 includes, at block 520, receiving a software product purchase request, and, at block 525, providing the software product, such as described above in the example of FIG. 5. At block 621, a user account is debited. The user account can be debited using the billing information received at block 520, such as before or after providing the software product at block 525. The user account can be debited (e.g., by the billing module 150) any time after receiving the software product purchase request at block 520. For example, the user account can be debited upon receipt of the software product purchase request, or upon initiation of a transmission of the software product from the software server 130 to the remote device 110. The user account can be debited upon successful completion of a transmission of the software product from the software server 130 to the remote device 110.

In the example of FIG. 6, at block 580 and block 582, compatibility information is received and analyzed, such as according to the discussion of FIG. 5. If the received software product is determined to be compatible with the remote device 110, the process terminates at block 695. For example, because the user was previously charged for the requested software product (e.g., by debiting the user account at block 621), the transaction is complete when the received software product successfully operates, or will successfully operate, with the remote device 110.

If the received software product is determined to be partially or entirely incompatible with the remote device 110, a user account is refunded at block 693. Refunding the user account at block 693 can include issuing an account credit, or releasing a credit hold on a user account, such as without converting the hold to a purchase transaction. In an example, refunding the user account at block 693 includes refunding a portion of the purchase amount debited at block 621.

Figure 7:
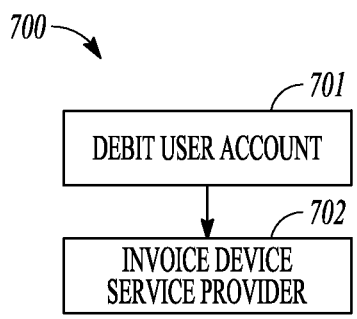
FIG. 7 is a flow chart that illustrates generally an example that includes invoicing a device service provider.
Figure 8:
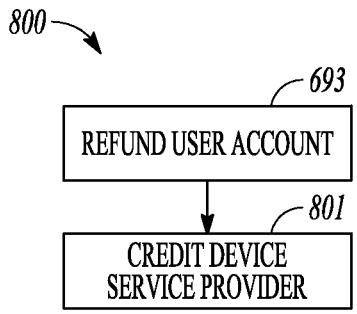
FIG. 8 is a flow chart that illustrates generally an example that includes crediting a device service provider.

FIG. 7 is a flow chart that illustrates generally an example 700 that includes invoicing a device service provider, and FIG. 8 is a flow chart that illustrates generally an example 800 that includes crediting a device service provider. The examples 700 or 800 include using a device service provider to manage a portion of a software product purchase transaction. The examples 700 or 800 can be executed using one or more server-side modules or devices, such as using the software server 130, the verification module 140, the billing module 150, or a service provider system, among others. A device service provider can include a cellular telephone carrier, an internet service provider, or another third party that can exchange information with the remote device 110 or the software server 130. For example, in integrated carrier billing, a mobile device user (e.g., a smartphone user) maintains an account with a service provider. When the mobile device is used to purchase software products from a remote software store (e.g., an application store or an online bookstore), charges or purchases are applied, such as automatically, to a regular monthly bill issued to the mobile device user from the service provider. In an example, one-time and recurring (e.g., subscription-based) purchases are supported.

The example 700 includes invoicing a device service provider. At block 701, a user account is debited, such as according to the discussion of FIG. 5 at block 591, or according to the discussion of FIG. 6 at block 621. In an example, the billing module 150 is used to debit the user account, and, upon successful debit of a purchase amount, the billing module 150 can instruct the software server 130 to provide the requested software product to a target device, such as the requesting device. In an example, all or a portion of the billing module 150 is operated by a device service provider.

Debiting the user account at block 701 optionally includes, at block 702, invoicing a device service provider. For example, the billing module 150 can receive billing information from the remote device 110, and the billing module 150 can communicate the billing information to the device service provider. The device service provider can maintain an account for the remote device 110, and can debit the account for the remote device 110, such as by an amount corresponding to a purchase amount of a requested software product. In an example, invoicing the device service provider at block 702 can occur before or after determining whether a requested software product is compatible with a target device.

The example 800 includes crediting a device service provider. At block 693, a user account is refunded, such as according to the discussion of FIG. 6. In an example, the billing module 150 debits, from a user account, a purchase amount corresponding to a requested software product. Upon identifying at least a partial incompatibility of the software product and its target device, the billing module 150 initiates a refund of all or a portion of the purchase amount.

Refunding the user account at block 693 optionally includes, at block 801, crediting a device service provider. For example, when a requested software product is at least partially incompatible with the target device, the billing module 150 can provide an indication to the device service provider to refund at least a portion of a previously debited, or previously charged, amount.

Figure 9:
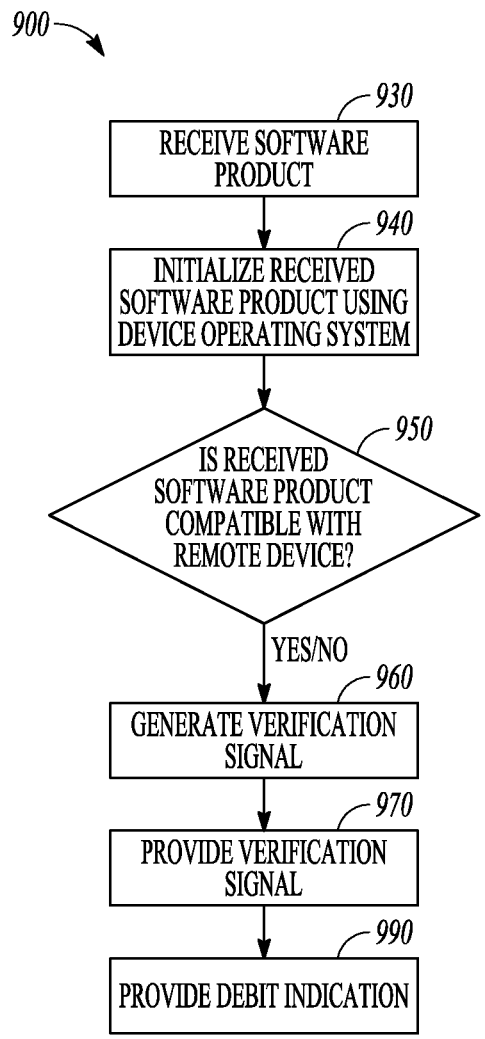
FIG. 9 is a flow chart that illustrates generally an example that includes providing a verification signal generated by a remote device.

FIG. 9 is a flow chart that illustrates generally an example 900 that includes providing a verification signal generated by a remote device. The example 900 can be executed using one or more remote devices or device-side modules, such as using the remote device 110 to provide a verification signal to the transaction manager 135. At block 930, a software product is received. The software product can be received from the software server 130, such as via the internet or a cellular data network. In an example, the software product is received in response to a user-initiated or device-initiated request (e.g., an automatically generated request, such as a request generated by a device operating system to obtain a latest version of a particular software product). In an example, the software product received at block 930 is stored in the device-side CRM 211, or in a memory system coupled to the remote device 110, and can be accessed using the device processor 210.

At block 940, the received software product is initialized, such as using an operating system of the remote device 110 and the device processor 210. Initializing the received software product at block 940 can include using the remote device 110 to operate, or to attempt to operate, at least a portion of the received software product. For example, initializing the received software product can include attempting to run the received software product using an operating system and/or device hardware or software configuration of the remote device 110. Initializing the received software product can include automatically examining a file type associated with the received software product to identify whether the operating system or device processor 210 is capable of executing or using software associated with the file type. In an example, initializing the received software product can include assessing a status of a file associated with the received software product, such as to identify whether the file is corrupt or operable.

In an example, initializing the received software product at block 940 includes assessing a specification component of the received software product. For example, a specification component includes, among other things, a file header or configuration file associated with the received software product, and can further include information about device-side requirements for using the received software product. A device-side requirement includes, among others, an operating system type or version, a specified hardware component, or a specified software component.

Initializing the received software product can include fully loading a the received software product into a working memory area of the remote device 110, such as loading the received software product at least partially into a RAM or cache memory. Initializing the received software product can include performing a diagnostic check on at least a portion of the received software product. A diagnostic check can be initiated by the device operating system, by the received software product, or by another hardware or software component of the remote device 110. In an example, initializing the received software product at block 940 can be performed after at least a portion of the software product is downloaded or streamed from the software server 130. Initializing the received software product at block 940 can be performed automatically or in response to a user request to initialize or operate the received software product.

At block 950, compatibility of the received software product and the remote device 110 is assessed. For example, the device processor 210 can monitor an initialization, or initialization attempt, of the received software product (e.g., at block 940) and determine whether the initialization was successful, partially successful, or unsuccessful. In an example, initializing the received software product at block 940 includes attempting to fully load or operate the received software product using a particular operating system and hardware component of the remote device 110. The device processor 210 observes whether the attempted operation was successful, such as by monitoring one or more memory locations used by the received software product, or by monitoring a behavior of a particular device-side hardware or software component. For example, where the received software product includes a camera application, the device processor 210 can observe whether the received software product successfully operates an attached camera component, such as by monitoring a memory location associated with the camera component. In an example, compatibility of the received software product and the remote device 110 can be assessed according the discussion of FIG. 4 at block 450.

At block 960, a verification signal is generated, such as automatically by the remote device 110. The verification signal includes information about whether the remote device 110 successfully initialized the received software product (e.g., compatibility information). The verification signal can be generated by the received software product, such as automatically in response to an initialization attempt. The verification signal can be generated by an operating system of the remote device 110, such as automatically in response to an initialization attempt.

In an example, if the assessment at block 950 indicates that the initialization was not successful, the verification signal generated at block 960 includes an indication that the initialization was not successful. If the assessment at block 950 indicates that the initialization was successful, or was partially successful, the verification signal generated at block 960 includes a corresponding indication that the initialization was fully or partially successful. In an example, the verification signal generated at block 960 can be a single bit to indicate successful or unsuccessful initialization, or the verification signal can include additional information, such as information about why an initialization was successful or unsuccessful (e.g., corrupt file, unavailability of a particular hardware component, etc.).

At block 970, a verification signal (e.g., generated at block 960) is provided, such as to an external module or device. The verification signal can be provided according to the discussion of FIG. 4 at block 470. In an example, the verification signal is provided to the verification module 140, the billing module 150, or the transaction manager 135. The verification signal can be received, such as by a verification or billing portion of the software server 130, such as according to the discussion of FIG. 5 at block 580.

At block 990, a debit indication is optionally provided, such as together with, or in addition to, the verification signal provided at block 970. In an example, a debit indication is derived, such as by the verification module 140 or billing module 150, using the verification signal. The debit indication includes, among other information, user account information, or an authorization or request to debit or credit a user account.

Figure 10:
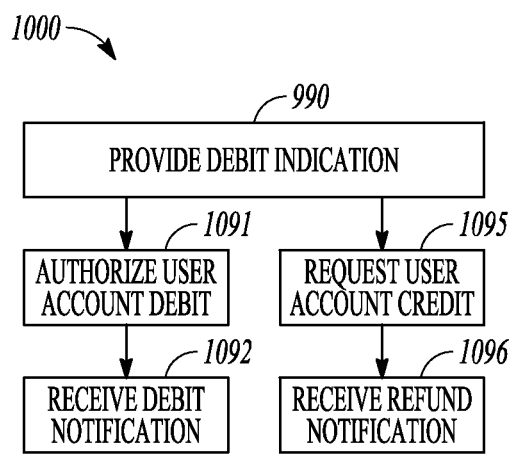
FIG. 10 is a flow chart that illustrates generally an example that includes providing a debit indication.

FIG. 10 is a flow chart that illustrates generally an example 1000 that includes providing a debit indication. Providing a debit indication at block 990, such as from the remote device 110 to the billing module 150, includes authorizing a user account debit at block 1091, or requesting a user account credit at block 1095. In an example, at block 1091, when a verification signal (e.g., generated at block 960 in the example of FIG. 9) indicates the received software product was successfully initialized by the remote device 110, the debit indication provided at block 990 includes an authorization to debit a user account. An authorization to debit a user account can include user account information and an authorized debit amount. The authorization can be provided automatically, or in response to a user input to the remote device 110.

At block 1092, a debit notification is optionally received in response to the debit authorization. The debit notification can be, among other things, a receipt provided by the billing module 150. The debit notification can be received at block 1092 by the remote device 110, such as via the received software product, or via another user-accessible service of the remote device 110, such as via email or SMS.

In an example, at block 1095, when the verification signal indicates the received software product was not successfully initialized by the remote device 110, the debit indication provided at block 990 includes a request to credit a user account. A request to credit a user account can include user account information and a requested debit amount. The request can be provided automatically, such as when the verification signal indicates an unsuccessful initialization of a received software product, or the request can be provided in response to a user input to the remote device 110.

At block 1096, a refund notification is optionally received in response to the credit request. The refund notification can be a receipt provided by the billing module 150. The refund notification can be received at block 1096 by the remote device 110, such as via an operable portion of the received software product, or via another service of the remote device 110, such as via email or SMS.

Figure 11:
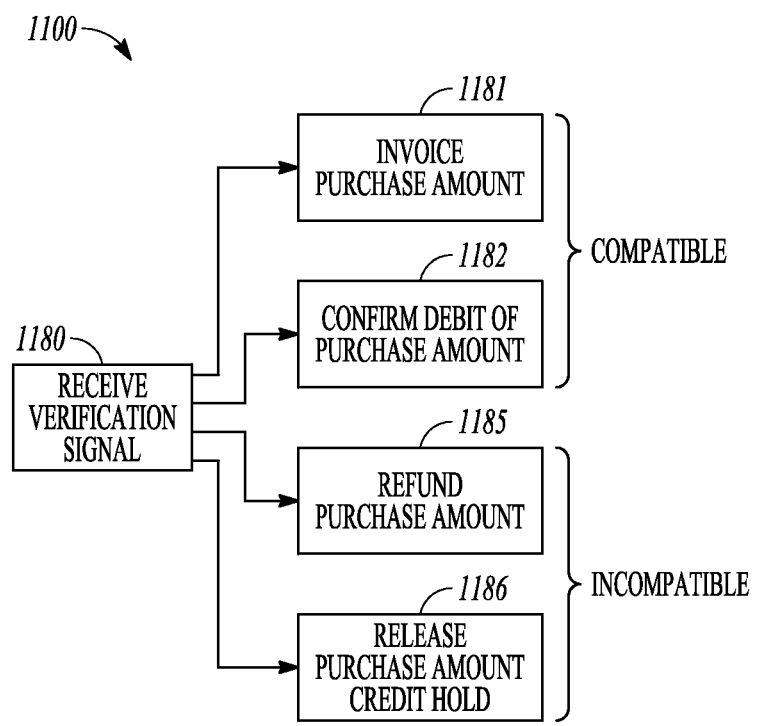
FIG. 11 is a flow chart that illustrates generally an example that includes using a verification signal generated by a remote device.

FIG. 11 is a flow chart that illustrates generally an example 1100 that includes using a verification signal generated by a remote device. At block 1180, a verification signal is received, such as from the remote device 110, or from a service provider of the remote device 110. In an example, the received verification signal includes a device-generated debit indication (see, e.g., FIG. 9 at block 990). At block 1181 and at block 1182, the received verification signal includes an indication that the remote device 110 and a software product provided by the software server 130 are at least partially compatible.

At block 1181, information from the received verification signal is used to invoice a software product purchase amount to a user account. At block 1181, the user account can be directly invoiced by the billing module 150, or the user account can be indirectly invoiced by providing user account or invoice information to a third party, such as to a device service provider. Invoicing the purchase amount at block 1181 can include invoicing a portion of a total purchase amount when the verification signal indicates at least a portion of the provided software product is incompatible with the remote device 110. At block 1182, information from the received verification signal is used to confirm a prior debit of a software product purchase amount. In an example, at block 1182, information from the received verification signal is used to convert a prior credit hold to a purchase transaction of the purchase amount. All or a portion of the prior credit hold can be converted to a purchase transaction, such as depending on whether the provided software product is fully or partially compatible with the remote device.

At block 1185 and block 1186, the received verification signal includes information that the remote device 110 and a software product provided by the software server 130 are at least partially incompatible. At block 1185, information from the received verification signal is used to refund a software product purchase amount to a user account. At block 1185, the user account can be directly refunded by the billing module 150, or the user account can be indirectly refunded by providing user account or refund information to a third party, such as to a device service provider. Refunding the purchase amount at block 1185 can include refunding a portion of a total purchase amount when the verification signal indicates at least a portion of the provided software product is compatible with the remote device 110. At block 1186, information from the received verification signal is used to release a prior credit hold of a purchase amount corresponding to the provided software product. All or a portion of the prior credit hold can be released or converted to a purchase transaction, such as depending on whether the provided software product is partially or wholly incompatible with the remote device.

Several examples are provided to further explain how the remote device 110, the software server 130, and/or the billing module 150, among other portions of a software distribution system, can be made or used. Example 1 can include or use subject matter (such as an apparatus, a method, a means for performing acts, or a device readable medium including instructions that, when performed by the device, can cause the device to perform acts), such as can include receiving, at a software server, a request for a software product, from a remote device. Example 1 can include, in response to the request for the software product, providing the software product to the remote device from the software server, and receiving, at a verification module coupled to the software server, a verification signal generated by the remote device about compatibility of the software product and the remote device.

Example 2 can include, or can optionally be combined with the subject matter of Example 1 to optionally include, receiving a request for a software application, providing the software application to the remote device, and receiving an indication generated by the remote device about compatibility of the software application and the remote device.

Example 3 can include, or can optionally be combined with the subject matter of one or any combination of Examples 1 or 2 to optionally include, receiving a request for a digital media file, providing the digital media file to the remote device, and receiving an indication generated by the remote device about compatibility of the digital media file and the remote device.

Example 4 can include, or can optionally be combined with the subject matter of one or any combination of Examples 1 through 3 to optionally include, receiving a purchase request for the software product, and receiving the indication at a billing verification module coupled to the software server.

Example 5 can include, or can optionally be combined with the subject matter of Example 4 to optionally include debiting, from a user account, a purchase amount corresponding to the provided software product when the received indication about compatibility indicates the software product is compatible with the remote device.

Example 6 can include, or can optionally be combined with the subject matter of one or any combination of Examples 4 or 5 to optionally include, invoicing a service provider of the remote device a purchase amount corresponding to the provided software product when the received indication about compatibility indicates the software product is compatible with the remote device.

Example 7 can include, or can optionally be combined with the subject matter of one or any combination of Examples 4 through 6 to optionally include, in response to the purchase request for the software product, providing the software product to the remote device includes debiting, from a user account, a purchase amount corresponding to the software product. In Example 7, receiving the indication at the billing verification module can include refunding at least a portion of the debited purchase amount when the received indication about the compatibility indicates the software product is incompatible with the remote device.

Example 8 can include, or can optionally be combined with the subject matter of one or any combination of Examples 4 through 7 to optionally include, in response to the purchase request for the software product, providing the software product to the remote device includes invoicing a service provider of the remote device a purchase amount corresponding to the software product. In Example 8, receiving the indication at the billing verification module can include refunding at least a portion of the invoiced amount when the received indication about the compatibility indicates the software product is incompatible with the remote device.

Example 9 can include, or can optionally be combined with the subject matter of one or any combination of Examples 1 through 8 to optionally include, receiving information about whether the software product successfully functions with an operating system of the remote device.

Example 10 can include or use subject matter (such as an apparatus, a method, a means for performing acts, or a device readable medium including instructions that, when performed by the device, can cause the device to perform acts), such as can include a computer-readable medium comprising computer-readable instructions for executing a method, the method comprising initializing, via an operating system of a computing device, a software product downloaded from a remote software server, automatically determining whether the initialized software product successfully operates with the operating system, using the automatic determination about whether the initialized software product successfully operates with the operating system, generating a verification signal, and transmitting the verification signal from the device to an external verification module.

Example 11 can include, or can optionally be combined with the subject matter of Example 10 to optionally include, transmitting the verification signal from the device including authorizing a remote billing module to debit, from a user account, a purchase amount corresponding to the initialized software product, such as when the transmitted verification signal includes an indication that the initialized software product successfully operates with the operating system.

Example 12 can include, or can optionally be combined with the subject matter of one or any combination of Examples 10 or 11 to optionally include, authorizing a remote billing module to debit, from a user account, a purchase amount corresponding to the initialized software product, and receiving a notification of a refund of at least a portion of the purchase amount when the transmitted verification signal includes an indication that the initialized software product unsuccessfully operates with the operating system of the device.

Example 13 can include, or can optionally be combined with the subject matter of one or any combination of Examples 10 through 12 to optionally include, transmitting the verification signal to a remote billing module that uses the verification signal to initiate a user account credit.

Example 14 can include, or can optionally be combined with the subject matter of one or any combination of Examples 10 through 13 to optionally include, instructions for executing the method that are operating system-level instructions of the computing device.

Example 15 can include, or can optionally be combined with the subject matter of one or any combination of Examples 10 through 13 to optionally include, instructions for executing the method that are application-level instructions.

Example 16 can include, or can optionally be combined with the subject matter of one or any combination of Examples 10 through 15 to optionally include, initializing a software application downloaded from a remote software application server, automatically determining whether the initialized software application successfully operates with the operating system, and using the automatic determination about whether the initialized software application successfully operates with the operating system to generate the verification signal.

Example 17 can include or use subject matter (such as an apparatus, a method, a means for performing acts, or a device readable medium including instructions that, when performed by the device, can cause the device to perform acts), such as can include a processor configured to execute a software product received from a remote software server, and a computer-readable medium comprising computer-readable instructions for executing a method on the processor. In Example 17, the method can include receiving a software product from the remote software server, determining whether the processor can successfully operate the received software product, and providing compatibility information about whether the processor can successfully operate the received software product.

Example 18 can include, or can optionally be combined with the subject matter of Example 17 to optionally include, receiving a software application from the remote software server, determining whether the processor can successfully operate the received software product, including determining whether the processor can successfully operate the received software application, and providing compatibility information, including providing compatibility information about whether the processor can successfully operate the received software application.

Example 19 can include, or can optionally be combined with the subject matter of one or any combination of Examples 17 or 18 to optionally include, receiving a digital media file from the remote software server, determining whether the processor can successfully operate the received software product, including determining whether the processor can successfully operate the received digital media file, and providing compatibility information, including providing compatibility information about whether the processor can successfully operate the received digital media file.

Example 20 can include, or can optionally be combined with the subject matter of one or any combination of Examples 17 through 19 to optionally include, determining whether the processor can successfully operate the received software product by initializing the received software product using the processor.

Example 21 can include, or can optionally be combined with the subject matter of one or any combination of Examples 17 through 20 to optionally include, providing the compatibility information, including providing a debit indication when the processor can successfully operate the received software product.

Example 22 can include, or can optionally be combined with the subject matter of one or any combination of Examples 17 through 21 to optionally include, providing the compatibility information, including providing a non-debit indication when the processor unsuccessfully operates the received software product.

Example 23 can include, or can optionally be combined with the subject matter of one or any combination of Examples 17 through 22 to optionally include, as the apparatus, a mobile computing device.

Example 24 can include, or can optionally be combined with the subject matter of Example 23 to optionally include, requesting the software product from the remote software server, wherein the remote software server is a remote software application vendor.

Example 25 can include or use subject matter (such as an apparatus, a method, a means for performing acts, or a device readable medium including instructions that, when performed by the device, can cause the device to perform acts), such as can include a system for wireless distribution of software products. In Example 25, the system for wireless distribution of software products can include a billing module comprising a computer-readable medium comprising computer-readable instructions for executing a method. In Example 25, the method can include receiving compatibility information, generated by a remote computing device, about whether a software product, downloaded to the remote computing device from a software store, functions with the remote computing device, and using the compatibility information, generated by the remote computing device, to update a debit status corresponding to the downloaded software product.

Example 26 can include, or can optionally be combined with the subject matter of Example 25 to optionally include, a billing module that is communicatively coupled to the remote computing device and the software store.

Example 27 can include, or can optionally be combined with the subject matter of one or any combination of Examples 25 or 26 to optionally include, using the compatibility information, generated by the remote computing device, to update the debit status, including invoicing a purchase amount of the downloaded software product when the received compatibility information indicates the downloaded software product is compatible with the remote device.

Example 28 can include, or can optionally be combined with the subject matter of one or any combination of Examples 25 through 27 to optionally include using the compatibility information, generated by the remote computing device, to update the debit status, including confirming a debit of the purchase amount of the downloaded software product when the compatibility information indicates the downloaded software product is compatible with the remote device.

Example 29 can include, or can optionally be combined with the subject matter of one or any combination of Examples 25 through 28 to optionally include, using the compatibility information, generated by the remote computing device, to update the debit status, including releasing a credit-hold corresponding to the downloaded software product when the compatibility information indicates the downloaded software product is incompatible with the remote device.

Example 30 can include, or can optionally be combined with the subject matter of one or any combination of Examples 25 through 29 to optionally include, using the compatibility information, generated by the remote computing device, to update the debit status, including refunding a previously-debited purchase amount, corresponding to the downloaded software product, when the compatibility information indicates the downloaded software product is incompatible with the remote device.

What is claimed is:

1. A method of software distribution accounting at a software server, the method comprising:

receiving, by the software server, a request from a remote device for a software product comprising an application;

providing, by the software server, the software product to the remote device;

receiving, by the software server, from the remote device, an initialization state of the software product on the remote device after providing the software product to the remote device, the initialization state indicating a state of the software product operating on the remote device using a specific hardware component of the remote device, the initialization state comprising compatibility information indicating one of:

fully compatible based on the remote device being capable of operating the software product using the specific hardware component, incompatible based on the remote device not being capable of operating the software product using the specific hardware component, or partially compatible based on the remote device missing a portion of the specific hardware component required to operate the software product; and updating, by the software server after providing the software product to the remote device and after receiving the initialization state comprising compatibility information indicating one of fully compatible, incompatible, or partially compatible, a billing status of a user account associated with the remote device by an amount based on the initialization state of the software product received from the remote device.

2. The method of claim 1, wherein receiving the request for the software product comprises receiving a purchase request for the software product, and wherein receiving the initialization state comprises receiving the initialization state at a billing verification module operably coupled with the software server.

3. The method of claim 1, wherein updating the billing status comprises debiting, from the user account, a purchase amount of the software product based on the compatibility information indicating partially compatible, wherein the remote device is capable of operating the software product using at least one of the specific hardware component or a software component.

4. The method of claim 2, further comprising invoicing, by the software server, a service provider of the remote device a purchase amount of the software product based on the compatibility information indicating fully compatible.

5. The method of claim 2, wherein the receiving the request for the software product comprises debiting, from the user account, a purchase amount of the software product, and wherein updating the billing status of the user account comprises refunding at least a portion of the debited purchase amount by an amount corresponding to the compatibility information based on the compatibility information indicating partially compatible.

6. The method of claim 2, wherein receiving the request for the software product comprises invoicing a service provider of the remote device a purchase amount of the software product, and wherein updating the billing status of the user account comprises refunding at least a portion of an invoiced amount based upon the compatibility information indicating partially compatible.

7. The method of claim 1, wherein the compatibility information further comprises required licenses or access permissions to use the specific hardware component of the remote device.

8. The method of claim 1, wherein the compatibility information indicates that the specific hardware component uses a peripheral device.

9. The method of claim 1 wherein the application is a camera application, wherein the specific hardware component comprises camera hardware components of the remote device, and wherein the software product is capable of operating using the specific hardware component and a software component of the remote device.

10. The method of claim 9, wherein the camera application further uses a Global Positioning System (GPS) receiver of the remote device.

11. The method of claim 10, wherein the compatibility information indicates that the camera application is only partially compatible with the remote device based on the specific hardware component and the software component being available and the GPS receiver not being available.

12. A software server for software distribution accounting, comprising:
a processor;
memory storing computer instructions that when executed by the processor cause the processor to:
receive a request from a remote device for a software product comprising an application;
provide the software product to the remote device;
receive, from the remote device, an initialization state of the software product on the remote device after providing the software product to the remote device, the initialization state indicating a state of the software product operating on the remote device using a specific hardware component of the remote device, the initialization state comprising compatibility information indicating one of:
fully compatible based on the remote device being capable of operating the software product using the specific hardware component,
incompatible based on the remote device not being capable of operating the software product using the specific hardware component, or
partially compatible based on the remote device missing a portion of the specific hardware component required to operate the software product; and
update, after providing the software product to the remote device and after receiving the initialization state comprising compatibility information indicating one of fully compatible, incompatible, or partially compatible, a billing status of a user account associated with the remote device by an amount based on the initialization state of the software product received from the remote device.

13. The software server of claim 12, wherein the computer instructions further cause the processor to debit, from the user account, a purchase amount of the software product based on the compatibility information indicating partially compatible, wherein the remote device is capable of operating the software product using at least one of the specific hardware component or a software component.

14. The software server of claim 12, wherein the computer instructions further cause the processor to debit, from the user account, a purchase amount of the software product.

15. The software server of claim 14, wherein the computer instructions further cause the processor to refund at least a portion of a debited purchase amount based on the compatibility information indicating partially compatible.

16. The software server of claim 12, wherein the compatibility information comprises required licenses or access permissions to use the specific hardware component of the remote device.

17. The software server of claim 12, wherein the compatibility information indicates that the specific hardware component is a peripheral device.

18. The software server of claim 12, wherein the application is a camera application, wherein the specific hardware component comprises camera hardware components of the remote device, and wherein the software product is capable of operating using the specific hardware component and software component of the remote device.

19. The software server of claim 18, wherein the camera application further uses a Global Positioning System (GPS) receiver of the remote device.

20. The software server of claim 19, wherein the compatibility information indicates that the camera application is only partially compatible with the remote device based on the specific hardware component and the software component being available and the GPS receiver not being available.

* * * * *